US012183965B2

(12) United States Patent
Qin et al.

(10) Patent No.: US 12,183,965 B2
(45) Date of Patent: Dec. 31, 2024

(54) TRANSMISSION MECHANISM FOR BASE STATION ANTENNA AND BASE STATION ANTENNA

(71) Applicant: Outdoor Wireless Networks LLC, Claremont, NC (US)

(72) Inventors: Haifei Qin, Suzhou (CN); Junfeng Yu, Suzhou (CN); Yuemin Li, Suzhou (CN); Rongrong Zhang, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 203 days.

(21) Appl. No.: 17/932,329

(22) Filed: Sep. 15, 2022

(65) Prior Publication Data

US 2023/0163448 A1 May 25, 2023

(30) Foreign Application Priority Data

Nov. 19, 2021 (CN) ......................... 202122854260.3

(51) Int. Cl.
*H01Q 1/24* (2006.01)
*H01Q 3/32* (2006.01)

(52) U.S. Cl.
CPC ............... *H01Q 1/246* (2013.01); *H01Q 3/32* (2013.01)

(58) Field of Classification Search
CPC ................................. H01Q 1/246; H01Q 3/32
See application file for complete search history.

(56) References Cited

U.S. PATENT DOCUMENTS

2020/0212565 A1* 7/2020 Li .......................... H01Q 1/246
2021/0126351 A1* 4/2021 Hou ......................... H01Q 1/02
2022/0224007 A1* 7/2022 Duan ...................... F16H 25/08

FOREIGN PATENT DOCUMENTS

WO WO-2005022601 A2 * 3/2005 .............. H01P 1/184

* cited by examiner

*Primary Examiner* — Daniel Munoz
(74) *Attorney, Agent, or Firm* — Myers Bigel, P.A.

(57) ABSTRACT

The present disclosure relates to a transmission mechanism for a base station antenna, and a base station antenna including the transmission mechanism. The transmission mechanism comprises: a worm gear unit, which is arranged on the first side of the reflector of the base station antenna and includes a worm driven by a motor and a worm gear meshed with the worm; a bevel gear pair unit, which is arranged on the second side of the reflection plate opposite to the first side and includes a first bevel gear and a second bevel gear meshed with each other, wherein the first bevel gear and the worm gear are coaxially installed on a first drive shaft; and at least one rack-and-pinion unit arranged on the second side of the reflection plate, wherein each rack-and-pinion unit includes a third gear and a rack element meshed with each other, all the third gears and the second bevel gears of the at least one rack-and-pinion unit are coaxially installed on a second drive shaft, and each rack element is fixed on the connecting rod of the phase shifter of the base station antenna for driving the connecting rod to move longitudinally. The transmission mechanism not only occupies a small total volume, but can also be installed in different spaces dispersedly, so that it can better adapt to the trend that the inner space of the base station antenna is getting smaller and more dispersed.

16 Claims, 9 Drawing Sheets

TRANSMISSION MECHANISM FOR BASE STATION ANTENNA AND BASE STATION ANTENNA

RELATED APPLICATION

The present application claims priority from and the benefit of Chinese Utility Model Application No. 202122854260.3, filed Nov. 19, 2021, the disclosure of which is hereby incorporated herein by reference in full.

FIELD OF THE INVENTION

The present disclosure generally relates to a communication system. More particularly, the present invention relates to a transmission mechanism for a base station antenna, and a base station antenna including such transmission mechanism.

BACKGROUND OF THE INVENTION

A cellular communication system is used to provide wireless communication to stationary and mobile users. The cellular communication system may include a plurality of base stations, and each base station provides a wireless cellular service for a designated coverage area (generally referred to as a “cell”). Each base station may include one or a plurality of base station antennas, and the base station antenna transmits radio frequency (“RF”) signals to a user located in a cell served by the base station and receives RF signals from the user. The base station antenna is a directional device that can converge RF energy transmitted in certain directions or received from certain directions.

A modern base station antenna usually includes two, three or more linear arrays of radiating elements, wherein each linear array has an electronically adjustable downtilt angle. The linear array usually includes a cross-polarized radiating element, and is provided with a separate phase shifter for electronically adjusting the downtilt angle of each polarized antenna beam, so that the antenna can include twice as many phase shifters as the linear arrays. In addition, separate transmission phase shifters and reception phase shifters are provided in many antennas, so that the transmitting and receiving radiation patterns of can be independently adjusted. This would again double the number of phase shifters. Therefore, the base station antenna may have eight, twelve, eighteen, thirty-two or more phase shifters for applying the remote electrically adjustable downtilt angle to the linear arrays.

A remote electrical tilt angle (“RET”) actuator including a single motor and an associated transmission mechanism may be provided in the base station antenna to adjust the phase shifter. FIG. 1 shows a transmission mechanism 100' of the prior art. The transmission mechanisms 100' are all arranged on the side of the reflector 2' facing the radome, and a plurality of phase shifters 140' are simultaneously driven by a motor 101'. The transmission mechanism 100' includes a driving rod 132' driven by a motor 101' by means of a screw 131', and a plurality of connecting rods 102' parallel to the driving rod 132' and spaced apart from each other in a direction perpendicular to the driving rod 132'. Each connecting rod 102' can drive one or more phase shifters to adjust its downtilt angle. A plurality of connecting rods 102' are fixed together via one or more connecting plates 133' to simultaneously move longitudinally under the driving of the driving rods 132', thereby driving a plurality of phase shifters 140'.

However, the transmission mechanism 100' is configured to be only arranged on the same side of the reflection plate 2', and the size of the occupied space (including the longitudinal length dimension of the reflection plate 2', the height dimension perpendicular to the reflection plate 2', etc.) is large. In some new designs of base station antennas, the spaces inside which the transmission mechanism can be accommodated are more and more dispersed, and each single space is smaller and smaller. For example, as shown in FIG. 2, on the side of the reflection plate 2 facing the filter 4, the filter 4 is designed to be closer to the reflection plate 2 than in the conventional design, so as to leave a small gap space between the two parts (for example, the longitudinal length is 60-80 mm, more particularly 70 mm, and the height is 20-40 mm, more particularly 32 mm). On the side of the reflection plate 2 facing the radome 3, the space height between the reflection plate 2 and the radome 3 is only 20-40 mm, more particularly 29 mm. These two spaces are not enough to accommodate the transmission mechanism of the existing design (including the transmission mechanism 100').

SUMMARY OF THE INVENTION

An object of the present invention is to provide a transmission mechanism for a base station antenna and a base station antenna including the transmission mechanism, which can overcome at least one defect in the prior art.

One aspect of the present disclosure relates to a transmission mechanism for a base station antenna, wherein the transmission mechanism comprises: a worm gear unit, which is arranged on the first side of the reflector of the base station antenna and includes a worm driven by a motor and a worm gear meshed with the worm; a bevel gear pair unit, which is arranged on the second side of the reflection plate opposite to the first side and includes a first bevel gear and a second bevel gear meshed with each other, wherein the first bevel gear and the worm gear are coaxially installed on a first drive shaft; and at least one rack-and-pinion unit arranged on the second side of the reflection plate, wherein each rack-and-pinion unit includes a third gear and a rack element meshed with each other, all the third gears and the second bevel gears of the at least one rack-and-pinion unit are coaxially installed on a second drive shaft, and each rack element is fixed on the connecting rod of the phase shifter of the base station antenna for driving the connecting rod to move longitudinally.

In some embodiments, the worm extends substantially in the lateral direction on the reflecting plate, and the central axis of the worm gear is arranged substantially perpendicular to the reflecting plate.

In some embodiments, the worm is mounted on the reflecting plate through a worm mounting device, the worm mounting device comprises a base plate fixed on the reflecting plate and two support plates extending upward from both ends of the base plate, and both ends of the worm are rotatably fixed on the two support plates respectively.

In some embodiments, the worm gear unit further comprises a rotation brake configured to prevent the worm from rotating in the same direction beyond a predetermined angular range.

In some embodiments, the central axis of the first bevel gear is arranged to be approximately perpendicular to the reflection plate, and the central axis of the second bevel gear extends approximately in the lateral direction.

In some embodiments, the first drive shaft extends through the reflection plate in a direction substantially perpendicular to the reflection plate, and is fixedly connected with the worm gear at the first side of the reflection plate, while fixedly connected with the first bevel gear at the second side of the reflection plate.

In some embodiments, the bevel gear pair unit is installed on the reflecting plate by a bevel gear installation device, the bevel gear installation device comprises a first plate fixed on the reflecting plate and a second plate vertically connected with the first plate, a first drive shaft used for the first bevel gear passes through the through hole of the first plate and is rotatably supported in the through hole of the first plate, and a second drive shaft used for the second bevel gear passes through the second plate and is rotatably supported in the through hole of the second plate.

In some embodiments, the number of the at least one rack-and-pinion unit is equal to that of the connecting rods, and the rack-and-pinion unit is associated with the first end of the connecting rod in a one-to-one manner, while the second end of the connecting rod is associated with the phase shifter.

In some embodiments, the central axis of the third gear extends substantially in the lateral direction and the rack element extends substantially in the longitudinal direction.

In some embodiments, each rack-and-pinion unit is installed on the reflecting plate by a rack-and-pinion installation device, wherein the rack-and-pinion installation device comprises a base plate fixed on the reflecting plate, and a first support plate and a second support plate protruding upward from the base plate, the second drive shaft for the third gear passes through the through hole of the first support plate and is rotatably supported in the through hole of the first support plate, and the second support plate is located near the first support plate and is constructed as a support rack element.

In some embodiments, the base station antenna includes a filter located at the first side of the reflection plate, and the motor and the worm gear unit are placed in the first space between the filter and the reflection plate.

In some embodiments, the longitudinal length of the first space is 60-80 mm and the height is 20-40 mm.

In some embodiments, the base station antenna comprises a radome located at the second side of the reflection plate, and the bevel gear pair unit and the at least one rack-and-pinion unit are placed in the second space between the radome and the reflection plate.

In some embodiments, the height of the second space is 20-40 mm.

In some embodiments, the worm gear unit, the bevel gear pair unit and the rack-and-pinion unit are made of plastic.

Another aspect of the present disclosure relates to a base station antenna, wherein the base station antenna comprises the above transmission mechanism for a base station antenna.

It should be noted that various aspects of the present disclosure described for one embodiment may be included in other different embodiments, even though specific description is not made for the other different embodiments. In other words, all the embodiments and/or features of any embodiment may be combined in any manner and/or combination, as long as they are not contradictory to each other.

DESCRIPTION OF THE FIGURES

A plurality of aspects of the present disclosure will be better understood after reading the following specific embodiments with reference to the attached drawings. Among the attached drawings.

It should be understood that in all the attached drawings, the same symbols denote the same elements. In the attached drawings, for clarity, the size of certain feature is not drawn to scale as it may change.

EMBODIMENTS OF THE INVENTION

Figure 1:
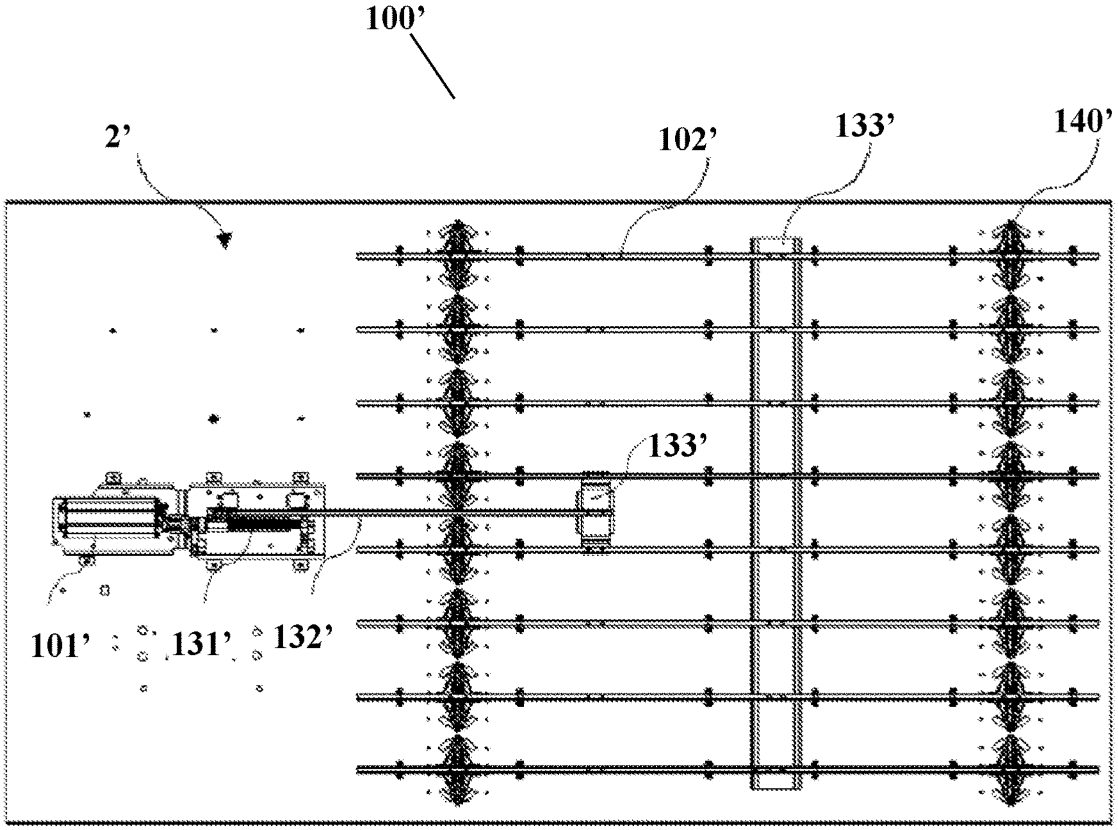
FIG. 1 shows a transmission mechanism for a base station antenna according to the prior art.
Figure 2:
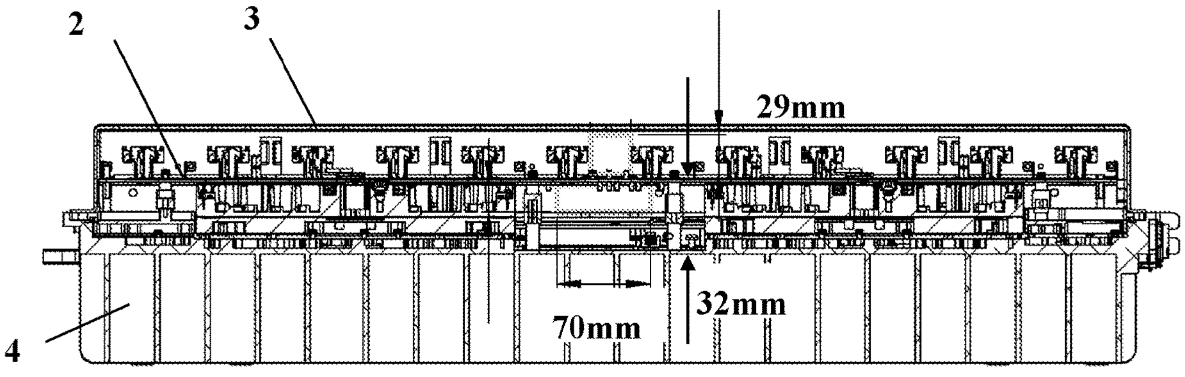
FIG. 2 shows a sectional view of a newly designed base station antenna.

The present disclosure will be described below with reference to the attached drawings, and the attached drawings illustrate certain embodiments of the present disclosure. However, it should be understood that the present disclosure may be presented in many different ways and is not limited to the embodiments described below; in fact, the embodiments described below are intended to make the content of the present disclosure more complete and to fully explain the protection scope of the present disclosure to those skilled in the art. It should also be understood that the embodiments disclosed in the present disclosure may be combined in various ways so as to provide more additional embodiments.

It should be understood that the words in the Specification are only used to describe specific embodiments and are not intended to limit the present disclosure. Unless otherwise defined, all terms (including technical terms and scientific terms) used in the Specification have the meanings commonly understood by those skilled in the art. For brevity and/or clarity, well-known functions or structures may not be further described in detail.

The singular forms "a", "an", "the" and "this" used in the Specification all include plural forms unless clearly indicated. The words "include", "contain" and "have" used in the Specification indicate the presence of the claimed features, but do not exclude the presence of one or a plurality of other features. The word "and/or" used in the Specification includes any or all combinations of one or a plurality of the related listed items.

In the Specification, when it is described that an element is "on" another element, "attached" to another element, "connected" to another element, "coupled" with another element, or "in contact with" another element, etc., the element may be directly on another element, attached to another element, connected to another element, coupled with another element, or in contact with another element, or an intermediate element may be present.

In the Specification, the terms "first", "second", "third", etc. are only used for convenience of description and are not intended for limitation. Any technical features represented by "first", "second", "third", etc. are interchangeable.

In the Specification, terms expressing spatial relations such as "upper", "lower", "front", "rear", "top", and "bottom" may describe the relation between one feature and another feature in the attached drawings. It should be understood that, in addition to the locations shown in the attached drawings, the words expressing spatial relations further include different locations of a device in use or operation. For example, when a device in the attached drawings is turned upside down, the features originally described as being "below" other features now can be described as being "above" the other features. The device may also be oriented by other means (rotated by 90 degrees or at other locations), and at this time, a relative spatial relation will be explained accordingly.

In the Specification, the direction parallel to the reflection plate 2 of the base station antenna and the connecting rod of the transmission mechanism is called the longitudinal direction, while the direction parallel to the reflection plate 2 of the base station antenna and perpendicular to the connecting rod of the transmission mechanism is called the lateral direction.

Figure 3A:
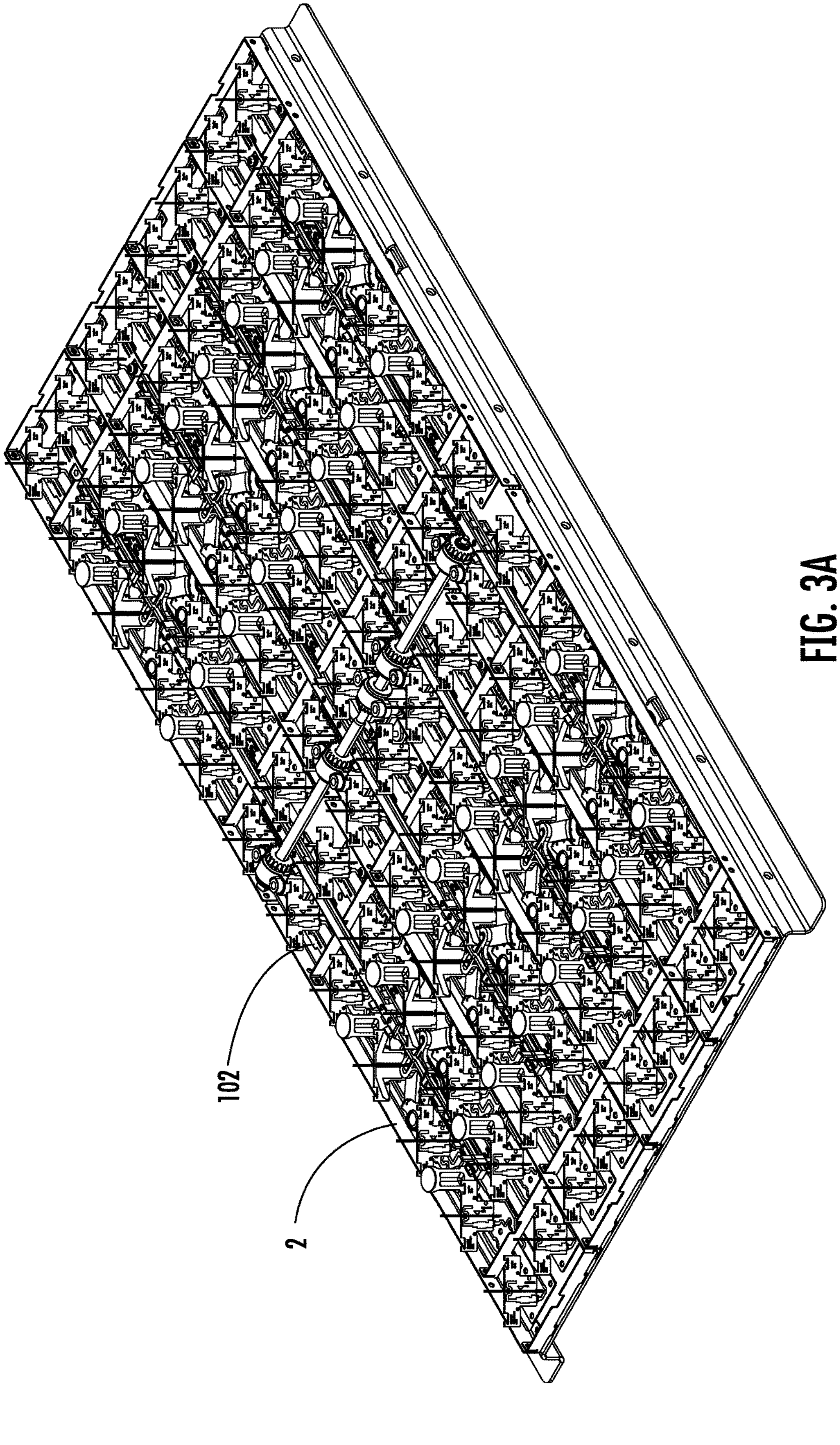
FIGS. 3A and 3B respectively show a front perspective view and a back perspective view of a reflection plate in which a transmission mechanism is mounted to a base station antenna according to an embodiment of the present disclosure.
Figure 3B:
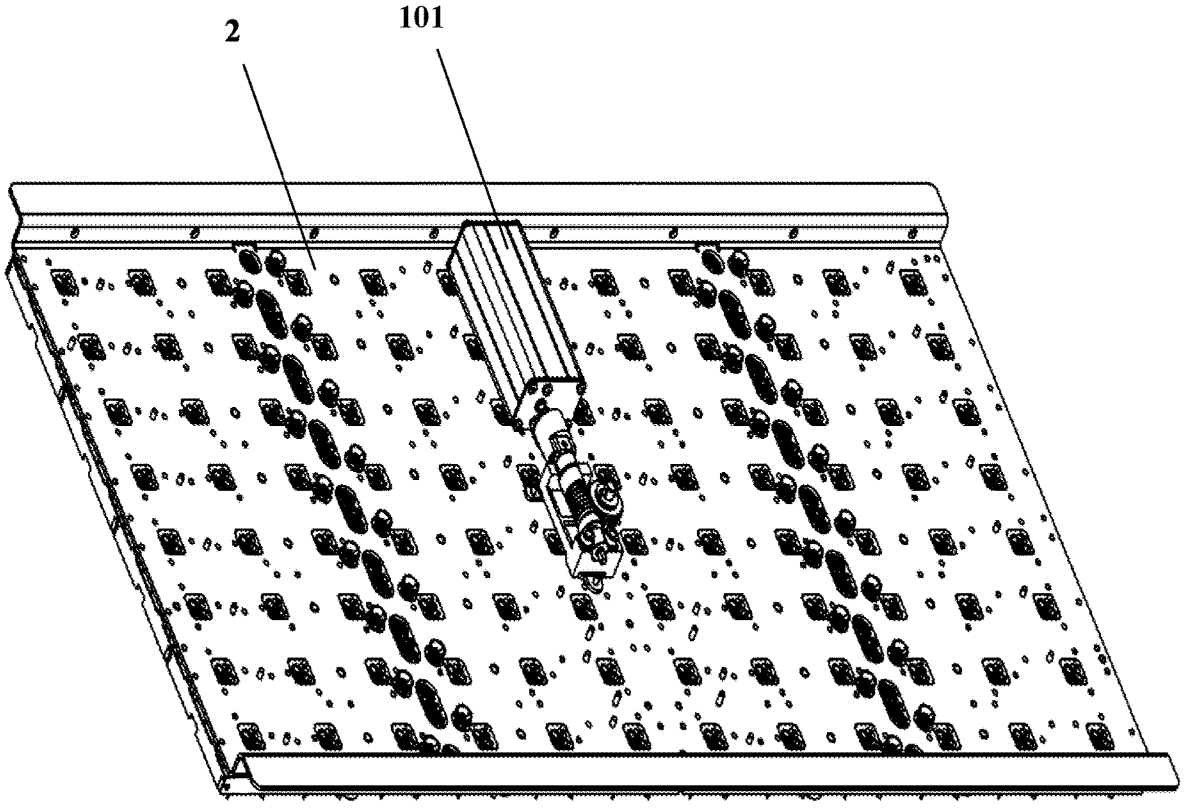
Figure 4A:
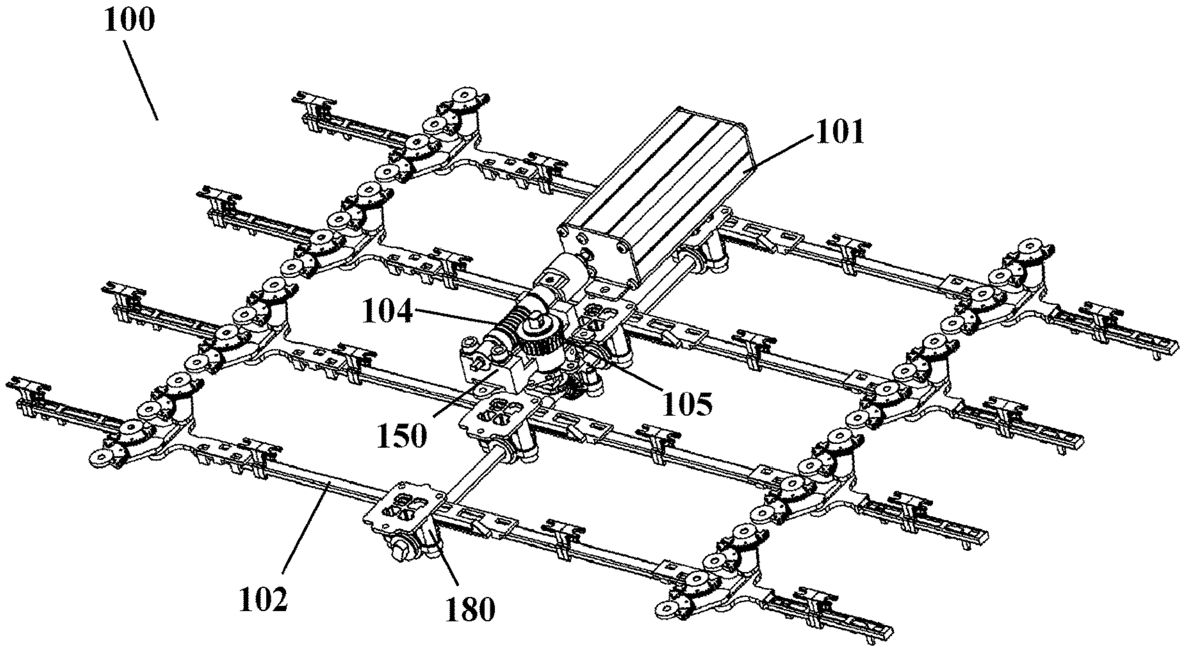
FIGS. 4A and 4B show separate front and back perspective views of the transmission mechanism of FIGS. 3A and 3B, respectively.
Figure 4B:
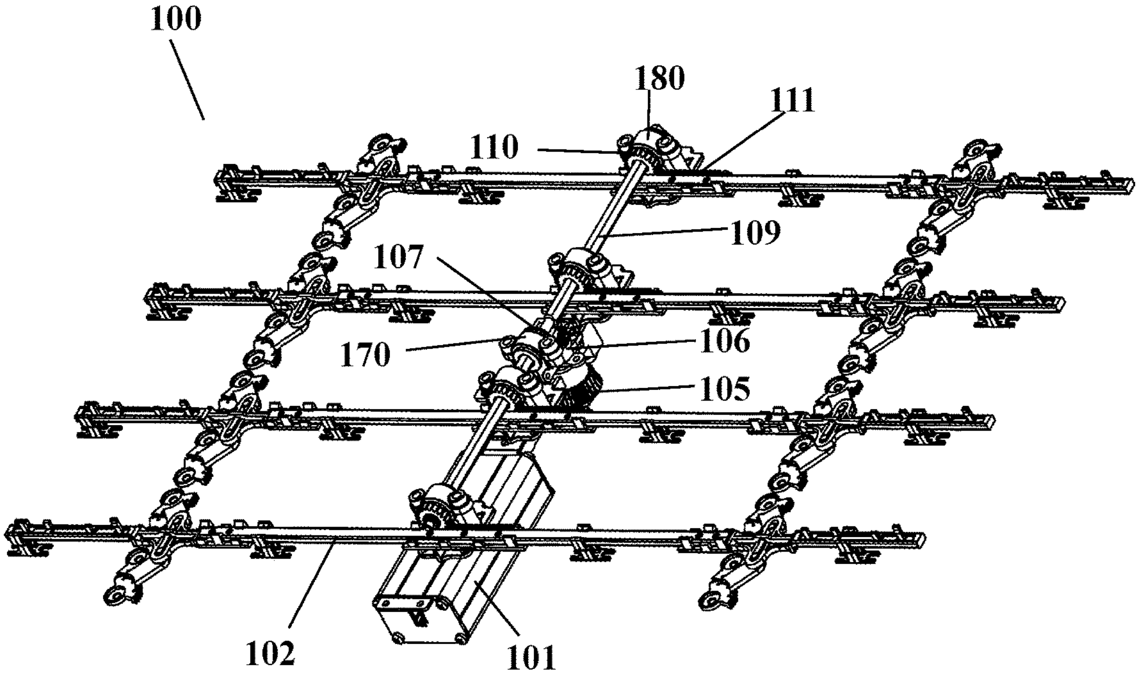
Figure 7:
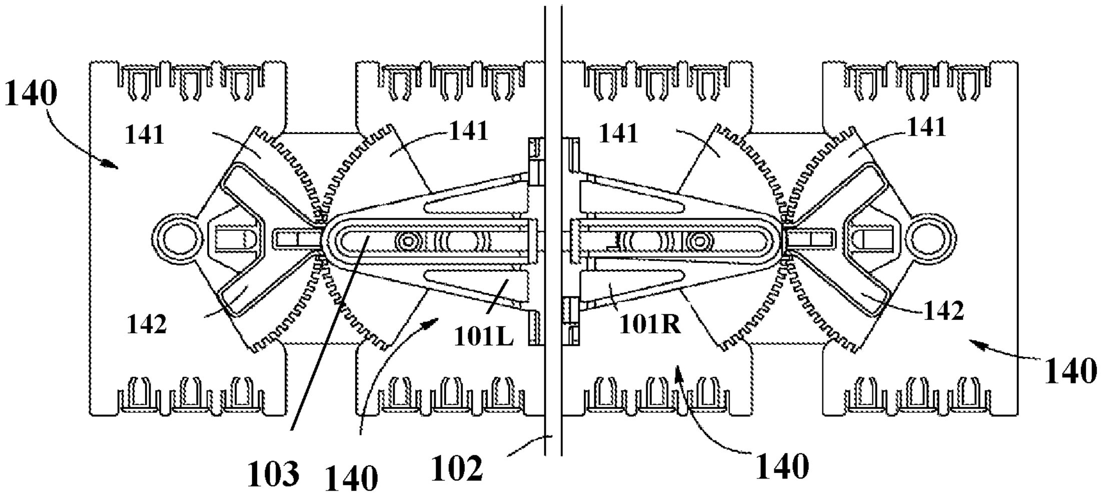
FIG. 7 shows the connection diagram of the connecting rod and the phase shifter.

FIGS. 3A and 3B show the front perspective view and the back perspective view of the transmission mechanism 100 installed to the reflection plate 2 according to the embodiment of the present disclosure, respectively, and FIGS. 4A and 4B show the front perspective view and the back perspective view separately of the transmission mechanism 100. As shown in the figures, the transmission mechanism 100 may include a plurality of connecting rods 102 arranged in parallel. The plurality of connecting rods 102 can be driven by a single motor 101 at the same time to move longitudinally, and each connecting rod 102 can drive the movable elements of one or more phase shifter 140 (for example, the brush plate of the rotary brush phase shifter) when moving longitudinally to adjust the directional angle (for example, the elevation angle or the downtilt angle) of the antenna beam generated by the base station antenna. The motor 101 is arranged on one side of the reflection plate 2 facing the filter 4, while the plurality of connecting rods 102 are arranged on the other side of the reflection plate 2 facing the radome 3. In the illustrated embodiment, the transmission mechanism 100 includes four connecting rods 102 arranged in parallel, and each connecting rod 102 can simultaneously drive two pairs of phase shifters 140 spaced apart along its longitudinal direction (exemplary phase shifters 140 are shown in FIG. 7), so that the transmission mechanism 100 can simultaneously drive sixteen phase shifters. However, the present disclosure is not limited to this, and the transmission mechanism 100 can be used to drive any other number of phase shifters. In an embodiment according to the present disclosure, the connecting rod 102 may be made of glass fiber, other plastics, or metal.

Figure 5A:
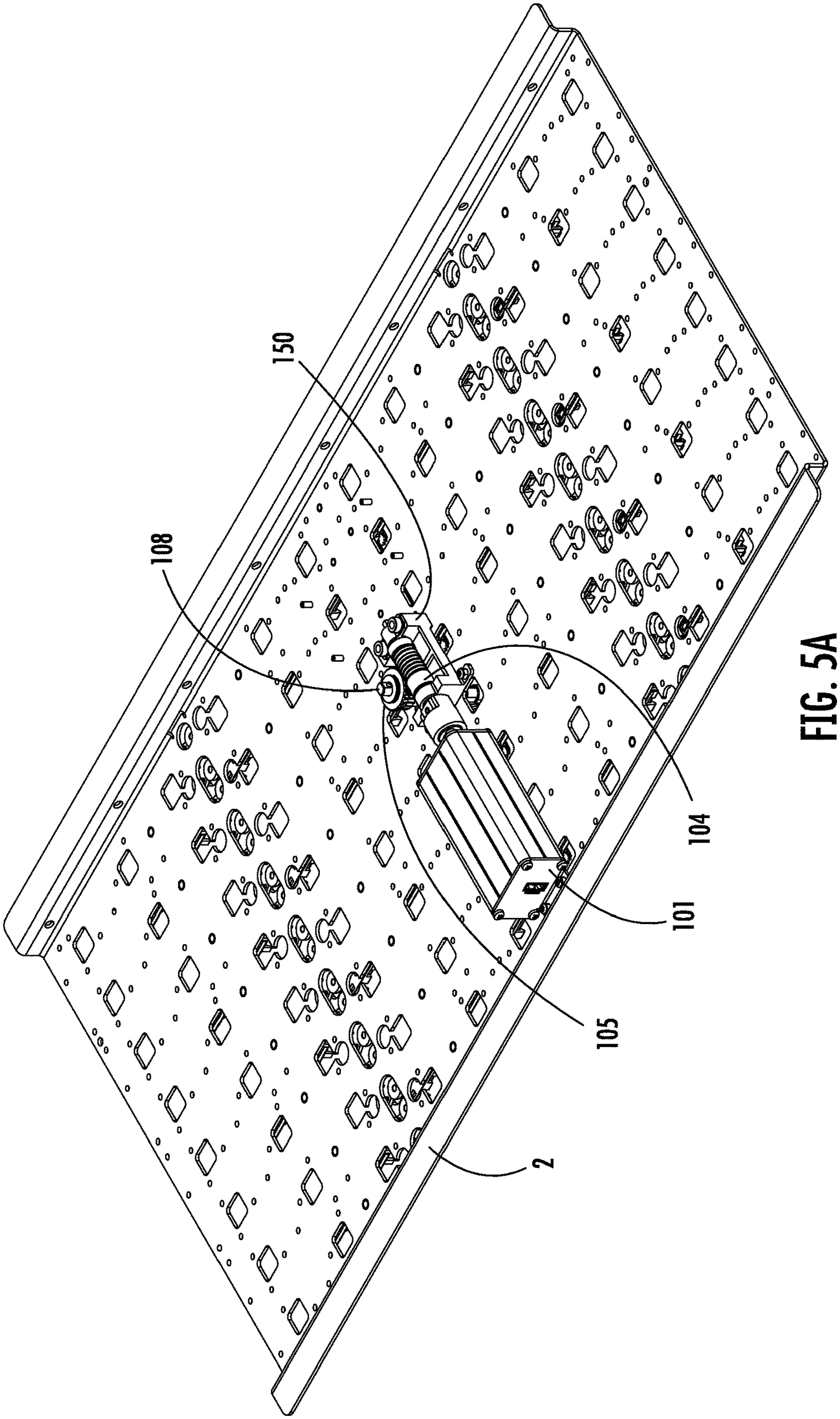
FIG. 5A shows the perspective view of the motor and worm gear unit of the transmission mechanism shown in FIGS. 3A and 3B mounted to the reflecting plate.
Figure 5B:
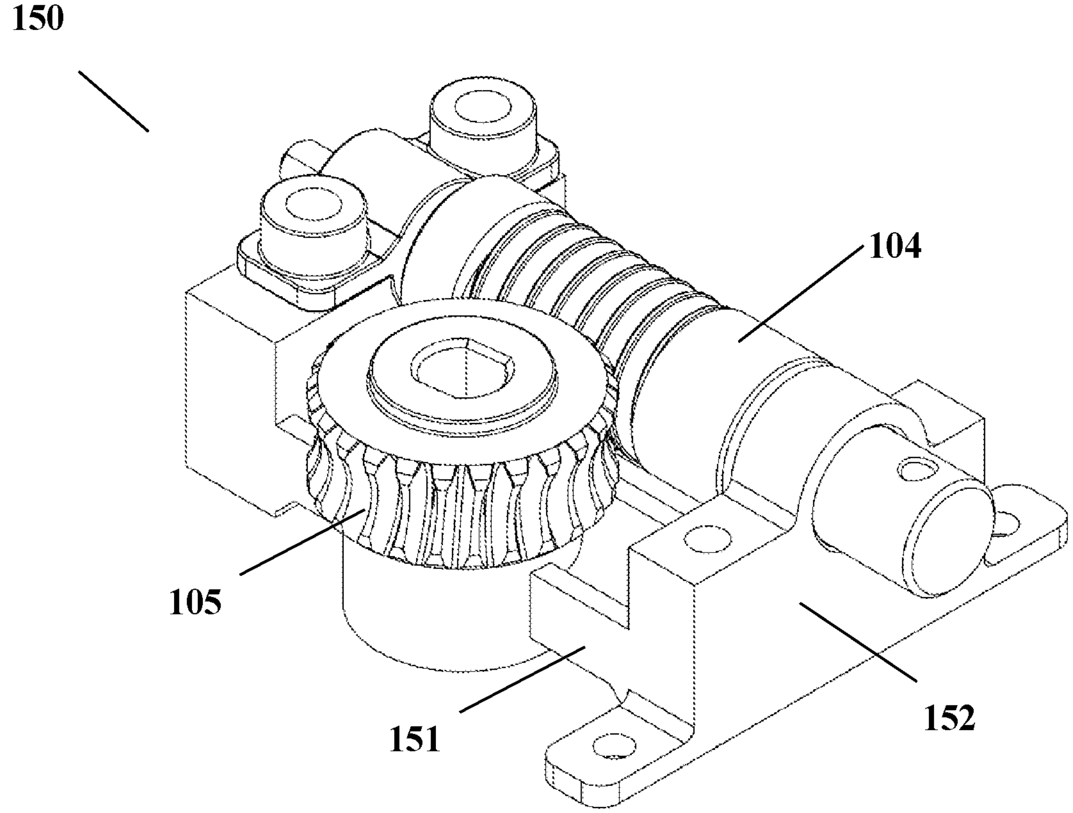
FIG. 5B shows the perspective view of the mounting device of the worm.
Figure 5C:
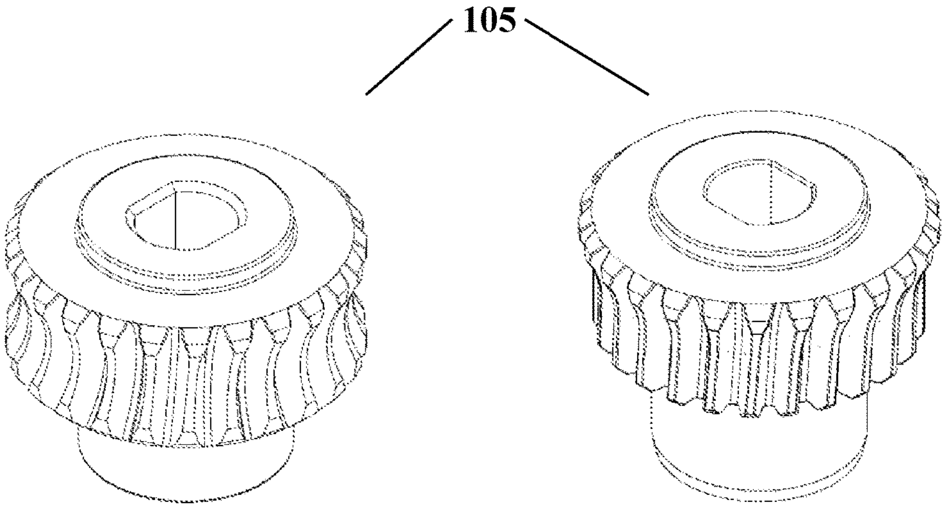
FIG. 5C shows the perspective view of different forms of the worm gear.

As shown in FIGS. 5A and 5B, the transmission mechanism 100 may include a worm gear unit, and the worm gear unit is arranged on the side of the reflection plate 2 facing the filter 4, that is, on the same side of the reflection plate 2 as the motor 101. The worm gear unit may include a worm 104 and a worm gear 105 meshed with the worm 104. The worm 104 extends substantially in the lateral direction. One end of the worm 104 can be directly or indirectly connected with the output shaft of the motor 101. Thus, the worm 104 is configured to be driven by the motor 101 to rotate around its central axis. The central axis of the worm gear 105 can be set to be approximately perpendicular to the reflection plate 2, and the worm gear 105 can be located above or below the longitudinal direction of the worm gear 104. The worm gear 105 meshes with the worm 104, and is driven by the worm 104 to rotate around its central axis. The teeth of the worm gear 105 can take various forms; for example, as shown in the left part of FIG. 5C, the tooth height of each tooth of the worm gear 105 is set to be high at both ends and low in the middle; as shown in the right part of FIG. 5C, the tooth height of each tooth of the worm gear 105 is set to decrease from one end to the other end.

In some embodiments, the worm 104 can be mounted on the reflecting plate 2 by a mounting device 150. The mounting device 150 includes a base plate 151 and two support plates 152 extending upward from both ends of the base plate 151. The base plate 151 is fixed on the reflection plate 2 by screws or any other method. Both ends of the worm 104 are rotatably (for example, by bearings) fixed on the two support plates 152, respectively. The base plate 151 is provided with a through hole, and the drive shaft 108 of the worm gear 105 passes through the through hole and is rotatably supported in the through hole (for example, by bearings).

In the embodiment according to the present disclosure, the output torque of the motor 101 can be amplified to different degrees by selecting the gear ratio of the worm 104 and the worm gear 105 of the worm gear unit, so that a single motor 101 can drive a larger number of phase shifters 140. Generally speaking, the number of threads of the worm 104 may be 1 to 5, and the number of teeth of the worm gear 105 may be several times the number of the threads of the worm 104. In an embodiment according to the present invention, the number of threads of the worm 104 may be 1, and the number of teeth of the worm gear 105 may be 15 to 50. Therefore, the gear ratio of the worm gear 105 and the worm 104 is from 15 to 50. In this way, the worm gear unit can amplify the output torque of the motor 101 by 15 to 50 times, so that when the same motor is used for driving, the pulling force generated by the transmission mechanism 100 is 15 to 50 times the pulling force generated by the transmission mechanism 1 in the prior art. The gear ratio of the worm gear 105 and the worm 104 may also be in other appropriate ranges, such as 5 to 50, 10 to 50, 5 to 40, 5 to 35, 5 to 30, 5 to 20, and so on.

The worm gear unit can reduce the output rotation speed of the motor 101 while amplifying the output torque of the motor 101, and a lower rotation speed makes it possible to adjust the phase shifter 140 more accurately. In addition, comparing with the screw 131' used in the prior art, the worm 104 of the worm gear unit can have a smaller length, which can reduce the space occupied by the transmission mechanism 100 in the base station antenna.

Figure 5D:
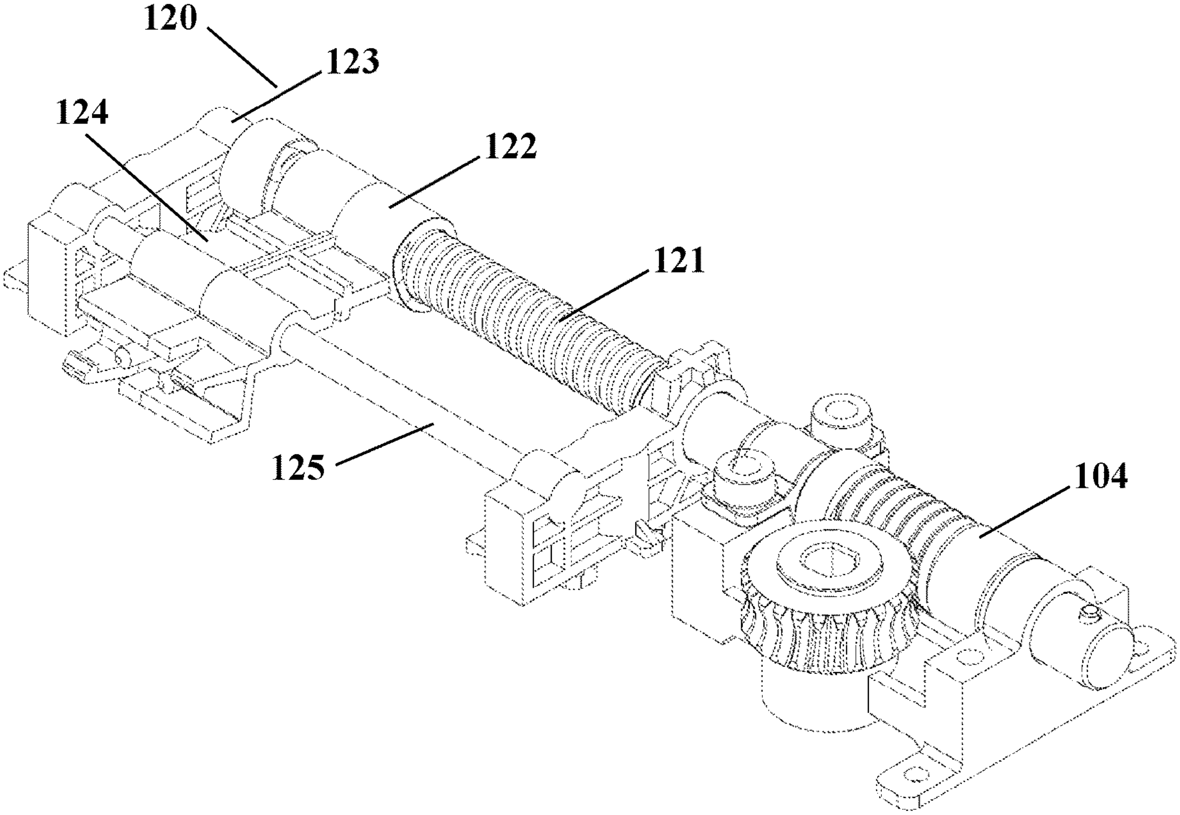
FIG. 5D shows the perspective view of the rotating brake of the worm gear unit.

In some embodiments, the worm gear unit further includes a rotation brake 120 to prevent the worm 104 from rotating in the same direction beyond a predetermined angular range, thereby limiting the amount of movement of the corresponding connecting rod 102 in the longitudinal direction. As shown in FIG. 5D, the rotation brake 120 includes a screw 121 extending substantially in the lateral direction and at least one nut 122 sleeved on the screw 121. The inner and outer ends of the screw 121 are set on a bracket 123, and the inner end is coaxially connected with the worm 104 to rotate with the rotation of the worm 104. Each nut 122 includes a wing portion 124 protruding outward from its side surface, and the wing portion 124 is provided with a through hole for a guide rod 125 extending substantially in the lateral direction to pass through. When the screw 121 rotates with the worm 104, the nut 122 reciprocates in the lateral direction on the screw 121 under the guidance of the guide rod 125. The nut 122 is provided with a convex portion or a concave portion on its outer end face, while the bracket 123 is provided with a corresponding concave portion or convex portion near the outer end of the screw 121. When the nut 122 moves to the outer end of the screw 121 in the lateral direction, the corresponding concave and convex parts of the nut 122 and the bracket 123 are locked, thereby restricting further rotation of the screw 121 and thus the worm 104.

Figure 6A:
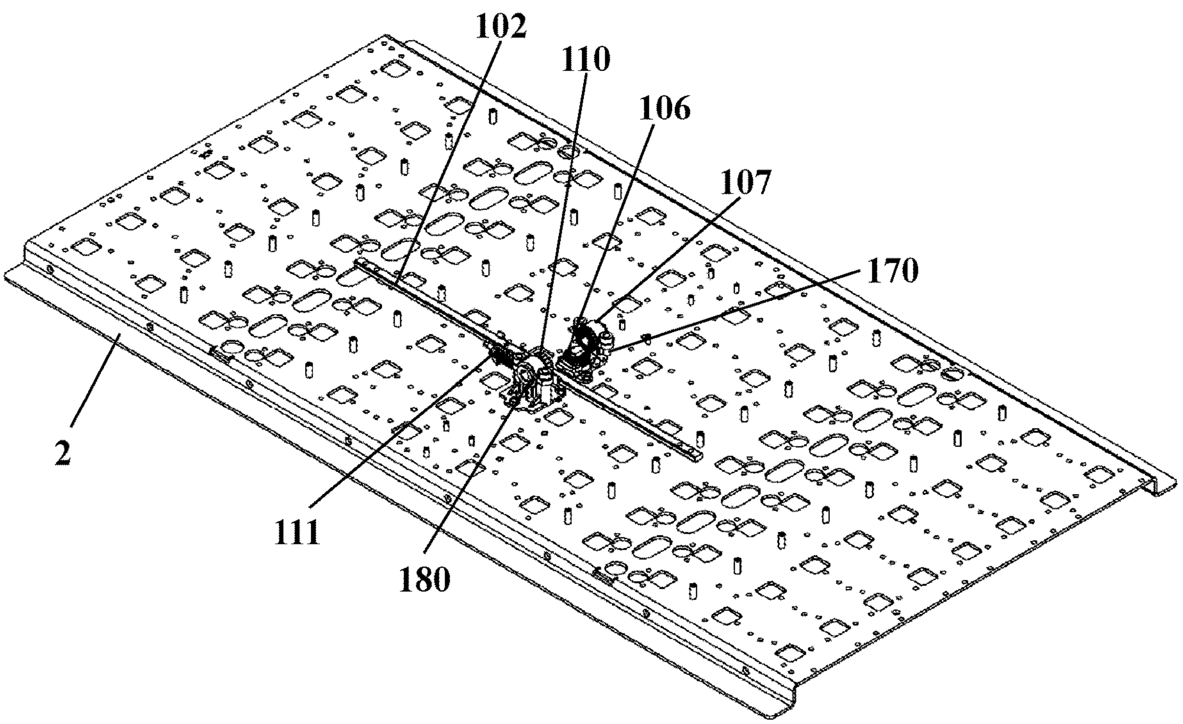
FIG. 6A shows the perspective view of a bevel gear pair unit and a rack-and-pinion unit of the transmission mechanism shown in FIGS. 3A and 3B mounted to the reflecting plate. In order to clearly show other components on the reflecting plate that are omitted.
Figure 6B:
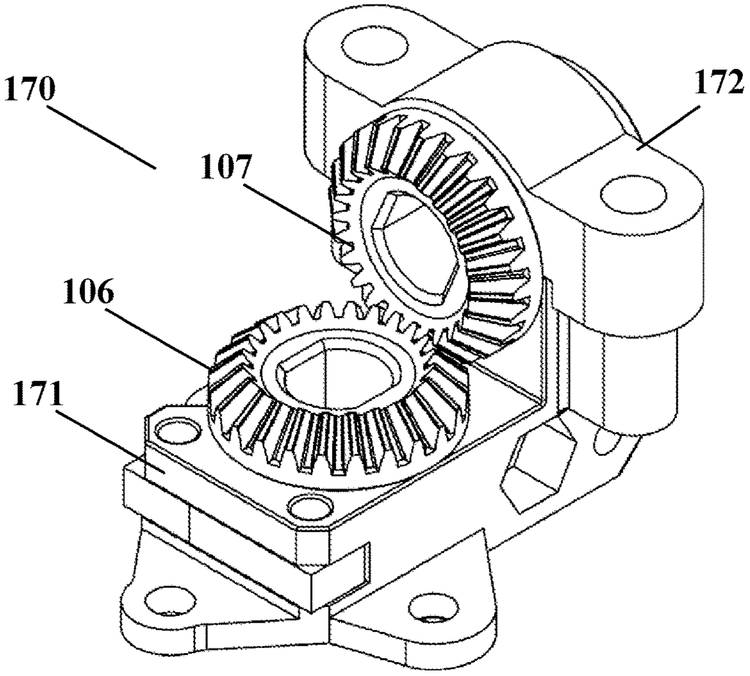
FIG. 6B shows a perspective view of the mounting device of the bevel gear pair unit and FIG. 6C shows a perspective view of the mounting device of the rack-and-pinion unit.

As shown in FIGS. 6A and 6B, the transmission mechanism 100 may further include a bevel gear pair unit, and the bevel gear pair unit is arranged on the side of the reflection plate 2 facing the radome 3, that is, on the opposite sides of the reflection plate 2 from the motor 101 and the worm gear unit. The bevel gear pair unit includes a first bevel gear 106 and a second bevel gear 107 that meshes with the first bevel gear 106. The central axis of the first bevel gear 106 can be set approximately perpendicular to the reflection plate 2, and installed on the drive shaft 108 coaxially with the worm gear 105 to rotate synchronously with the worm gear 105. The drive shaft 108 extends through the reflection plate 2 in a direction substantially perpendicular to the reflection plate 2, and is fixedly connected with the worm gear 105 at one side of the reflection plate 2 and the first bevel gear 106 at the other side of the reflection plate 2. The drive shaft 108 can ensure that the worm gear 105 and the first bevel gear 106 have the same rotational speed, and can transmit the output torque of the worm gear 105 to the first bevel gear 106.

The central axis of the second bevel gear 107 extends approximately in the lateral direction, and can be mounted on another drive shaft 109. The second bevel gear 107 is driven by the first bevel gear 106 to rotate around its central axis. The drive shaft 109 is connected to a plurality of rack-and-pinion units (which will be described in detail later), and enables the plurality of rack-and-pinion units to have the same rotational speed and thus uniform output torque.

In an embodiment according to the present invention, the drive shaft 108 may have a non-circular (for example, rectangular) cross-section, which extends through a non-circular hole provided in the center of a first bevel gear 106 for matching with the non-circular cross section of the drive shaft 108, so that the first bevel gear 106 is not rotatable relative to the drive shaft 108. Similarly, the drive shaft 109 may have a non-circular (for example, rectangular) cross-section, which extends through a non-circular hole provided in the center of a second bevel gear 107 for matching with the non-circular cross-section of the drive shaft 109, so that the second bevel gear 107 is not rotatable relative to the drive shaft 109. In another embodiment according to the present disclosure, the drive shaft 108 may be integrally formed with the first bevel gear 106 and/or worm gear 105, and the drive shaft 109 may also be integrally formed with the second bevel gear 107 and/or gear 110 (which will be described in detail later).

In some embodiments, the bevel gear pair unit is mounted on the reflection plate 2 by the mounting device 170. The mounting device 170 is substantially L-shaped, and includes a first plate 171 and a second plate 172 vertically connected. The first plate 171 is provided with a through hole in the middle thereof, and the drive shaft 108 of the first bevel gear 106 passes through the through hole and is rotatably supported in the through hole (for example, by a bearing). The first plate 171 is fixed on the reflecting plate 2 by screws or any other method. The second plate 172 is provided with a through hole in its center, and the drive shaft 109 of the second bevel gear 107 passes through the through hole and is rotatably supported in the through hole (for example, by a bearing).

By selecting the tooth ratio of the second bevel gear 107 to the first bevel gear 106 as needed, the output torque of the motor 101 can be further amplified to different degrees and the output rotation speed of the motor 101 can be reduced at the same time, which makes it possible not only to simultaneously drive a larger number of phase shifters with a single motor 101, but also to adjust the phase shifters more accurately at a slower speed.

Figure 6C:
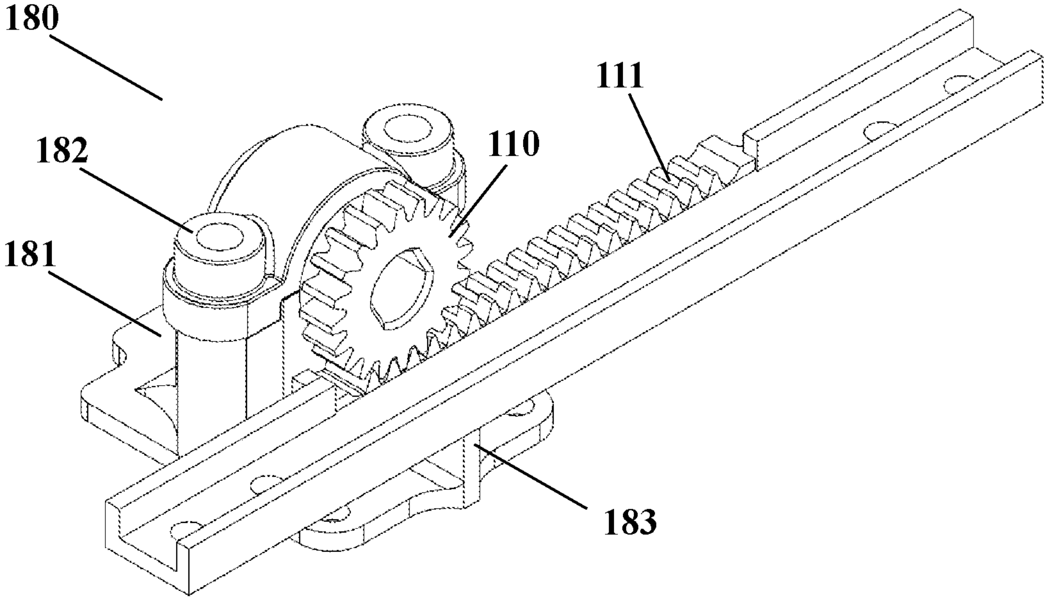

As shown in FIGS. 6A and 6C, the transmission mechanism 100 may further include a plurality of rack-and-pinion units, and the rack-and-pinion units are arranged on the other side of the reflection plate 2 facing the radome 3, that is, on the same side of the reflection plate 2 as the bevel gear pair units. The number of rack-and-pinion units is equal to that of the plurality of connecting rods 102, and they are associated in a one-to-one manner to drive the corresponding ones of the connecting rods 102 to move longitudinally. Each rack-and-pinion unit includes a gear 110 and a rack element 111 meshed with the gear 110. The central axis of the gear 110 extends substantially in the lateral direction, and is installed on the drive shaft 109 coaxially with the second bevel gear 107 of the bevel gear pair unit. The drive shaft 109 can ensure that the second bevel gear 107 and each gear 110 of the plurality of rack-and-pinion units have the same rotational speed, and can transmit the output torque of the second bevel gear 107 to each gear 110.

The rack element 111 extends substantially in the longitudinal direction and is driven by the gear 110 to move in the longitudinal direction. The rack element 111 can be fixed on a first end of the connecting rod 102, while the opposite second end of the connecting rod 102 is associated with one or more phase shifters 140. Therefore, when the gear 110 rotates, it can move the connecting rod 102 longitudinally through the rack element 111, and then move the movable elements of one or more phase shifters 140 to adjust the downtilt angle of the antenna beam.

In some embodiments, the rack-and-pinion unit can be mounted on the reflecting plate 2 by the mounting device 180. The mounting device 180 includes a base plate 181 and a first support plate 182 protruding upward from the middle of the base plate 181. The base plate 181 is fixed on the reflection plate 2 by screws or any other method. The first support plate 182 is provided with a through hole in the middle thereof, and the drive shaft 109 of the gear 110 passes through the through hole and is rotatably supported in the through hole (for example, by a bearing). The mounting device 180 further includes a second support plate 183 protruding upward from the base plate 181 for supporting the rack element 111 and its associated connecting rod 102. The second support plate 183 is located near the first support plate 182 and extends perpendicular to the first support plate 182.

FIG. 7 shows a schematic diagram of the relationship between the second end of the connecting rod 102 and the phase shifter 140. As shown in the figure, each phase shifter 140 is provided with a sliding vane support block 141 above it, and the sliding vane support block 141 is fixed to the movable element of the phase shifter 140. The phase shifters 140 may be arranged in pairs, whereby the sliding vane support blocks 141 are arranged in pairs. The paired sliding vane support blocks 141 are meshed to each other through the respective outer teeth. Hence, the pivoting of one of the sliding vane support blocks 141 is capable of driving the pivoting of another sliding vane support block 141. One of the paired sliding vane support blocks 141 is provided with a slide post 142, and extends outward perpendicular to the surface of the sliding vane support block 141.

The connecting rod 102 includes a left wing portion 101L and a right wing portion 101R laterally protruding from its second end. Each of wings 101L, 101R is provided with an elongated through groove 103 extending in the lateral direction. The elongated through groove 103 is used to receive the sliding post 142 of the sliding vane support block 141, and guide the sliding post 142 to reciprocate in the elongated through slot 103, thus driving the pivoting of the paired sliding vane support blocks 141, thereby driving the pivoting of the movable elements of the paired phase shifters 140 to adjust the downtilt angle of the antenna beam.

In the embodiment according to the present disclosure, the worm gear unit, the bevel gear pair unit and the rack-and-pinion unit can all be made of plastic, and the drive shafts 108 and 109 can be made of fiberglass. In order to further enhance the torsional strength of the drive shafts 108 and 109, the drive shafts 108 and 109 may also be made of metal or other materials with high torsional strength.

The transmission mechanism 100 according to the embodiment of the present disclosure not only occupies a small total volume, but can also be installed in different spaces dispersedly, so that it can better adapt to the trend that the inner space of the base station antenna is getting smaller and more dispersed.

In addition, although the transmission mechanism 100 according to the present disclosure includes a plurality of connecting rods 102 in the illustrated embodiment, the transmission mechanism 100 according to the present disclosure may include only one connecting rod 102. In this case, the transmission mechanism 100 can still amplify the output torque of the motor 101 and reduce the output rotation speed of the motor 101 through the worm gear unit and the bevel gear pair unit, thereby still retaining all the aforementioned advantages of the transmission mechanism 100.

Exemplary embodiments according to the present disclosure have been described above with reference to the attached drawings. However, those of ordinary skill in the art should understand that various changes and modifications can be made to the exemplary embodiments of the present disclosure without departing from the gist and scope of the present disclosure. All changes and modifications are included in the protection scope of the present disclosure defined by the claims. The present disclosure is defined by the attached claims, and equivalents of these claims are also included.

The invention claimed is:

1. A transmission mechanism for a base station antenna, wherein the transmission mechanism comprises:

a worm gear unit, which is arranged on the first side of a reflector of the base station antenna and includes a worm driven by a motor and a worm gear meshed with the worm;

a bevel gear pair unit, which is arranged on the second side of the reflection plate opposite to the first side and includes a first bevel gear and a second bevel gear meshed with each other, wherein the first bevel gear and the worm gear are coaxially installed on a first drive shaft; and at least one rack-and-pinion unit arranged on the second side of the reflection plate, wherein each rack-and-pinion unit includes a third gear and a rack element meshed with each other, all the third gears and the second bevel gears of the at least one rack-and-pinion unit are coaxially installed on a second drive shaft, and each rack element is fixed on the connecting rod of the phase shifter of the base station antenna for driving the connecting rod to move longitudinally;

wherein the central axis of the third gear extends substantially in the lateral direction and the rack element extends substantially in the longitudinal direction; and wherein each rack-and-pinion unit is installed on the reflecting plate by a rack-and-pinion installation device, wherein the rack-and-pinion installation device comprises a base plate fixed on the reflecting plate, and a first support plate and a second support plate protruding upward from the base plate, the second drive shaft for the third gear passes through the through hole of the first support plate and is rotatably supported in the through hole of the first support plate, and the second support plate is located near the first support plate and is constructed as a support rack element.

2. The transmission mechanism for a base station antenna according to claim 1, wherein the worm extends substantially in the lateral direction on the reflecting plate, and the central axis of the worm gear is arranged substantially perpendicular to the reflecting plate.

3. The transmission mechanism for a base station antenna according to claim 2, wherein the worm is mounted on the reflecting plate through a worm mounting device, the worm mounting device comprises a base plate fixed on the reflecting plate and two support plates extending upward from both ends of the base plate, and both ends of the worm are rotatably fixed on the two support plates respectively.

4. The transmission mechanism for a base station antenna according to claim 2, wherein the worm gear unit further comprises a rotation brake configured to prevent the worm from rotating in the same direction beyond a predetermined angular range.

5. The transmission mechanism for a base station antenna according to claim 1, wherein the central axis of the first bevel gear is arranged to be approximately perpendicular to the reflection plate, and the central axis of the second bevel gear extends approximately in the lateral direction.

6. The transmission mechanism for a base station antenna according to claim 5, wherein the first drive shaft extends through the reflection plate in a direction substantially perpendicular to the reflection plate, and is fixedly connected with the worm gear at the first side of the reflection plate, while fixedly connected with the first bevel gear at the second side of the reflection plate.

7. The transmission mechanism for a base station antenna according to claim 5, wherein the bevel gear pair unit is installed on the reflecting plate by a bevel gear installation device, the bevel gear installation device comprises a first plate fixed on the reflecting plate and a second plate vertically connected with the first plate, a first drive shaft used for the first bevel gear passes through the through hole of the first plate and is rotatably supported in the through hole of the first plate, and a second drive shaft used for the second bevel gear passes through the second plate and is rotatably supported in the through hole of the second plate.

8. The transmission mechanism for a base station antenna according to claim 1, wherein the number of the at least one rack-and-pinion unit is equal to that of the connecting rods, and the rack-and-pinion unit is associated with the first end of the connecting rod in a one-to-one manner, while the second end of the connecting rod is associated with the phase shifter.

9. The transmission mechanism for a base station antenna according to claim 1, wherein the base station antenna includes a filter located at the first side of the reflection plate, and the motor and the worm gear unit are placed in the first space between the filter and the reflection plate.

10. The transmission mechanism for a base station antenna according to claim 9, wherein the longitudinal length of the first space is 60-80 mm and the height is 20-40 mm.

11. The transmission mechanism for a base station antenna according to claim 1, wherein the base station antenna comprises a radome located at the second side of the reflection plate, and the bevel gear pair unit and the at least one rack-and-pinion unit are placed in the second space between the radome and the reflection plate.

12. The transmission mechanism for a base station antenna according to claim 11, wherein the height of the second space is 20-40 mm.

13. The transmission mechanism for a base station antenna according to claim 1, wherein the worm gear unit, the bevel gear pair unit and the rack-and-pinion unit are made of plastic.

14. A base station antenna, wherein the base station antenna comprises the transmission mechanism for a base station antenna according to claim 1.

15. A transmission mechanism for a base station antenna, wherein the transmission mechanism comprises:

a worm gear unit, which is arranged on the first side of a reflector of the base station antenna and includes a worm driven by a motor and a worm gear meshed with the worm;

a bevel gear pair unit, which is arranged on the second side of the reflection plate opposite to the first side and includes a first bevel gear and a second bevel gear meshed with each other, wherein the first bevel gear and the worm gear are coaxially installed on a first drive shaft; and at least one rack-and-pinion unit arranged on the second side of the reflection plate, wherein each rack-and-pinion unit includes a third gear and a rack element meshed with each other, all the third gears and the second bevel gears of the at least one rack-and-pinion unit are coaxially installed on a second drive shaft, and each rack element is fixed on the connecting rod of the phase shifter of the base station antenna for driving the connecting rod to move longitudinally;

wherein the base station antenna includes a filter located at the first side of the reflection plate, and the motor and the worm gear unit are placed in the first space between the filter and the reflection plate; and wherein the longitudinal length of the first space is 60-80 mm and the height is 20-40 mm.

16. A transmission mechanism for a base station antenna, wherein the transmission mechanism comprises:

a worm gear unit, which is arranged on the first side of a reflector of the base station antenna and includes a worm driven by a motor and a worm gear meshed with the worm;

a bevel gear pair unit, which is arranged on the second side of the reflection plate opposite to the first side and includes a first bevel gear and a second bevel gear meshed with each other, wherein the first bevel gear and the worm gear are coaxially installed on a first drive shaft; and at least one rack-and-pinion unit arranged on the second side of the reflection plate, wherein each rack-and-pinion unit includes a third gear and a rack element meshed with each other, all the third gears and the second bevel gears of the at least one rack-and-pinion unit are coaxially installed on a second drive shaft, and each rack element is fixed on the connecting rod of the phase shifter of the base station antenna for driving the connecting rod to move longitudinally;

wherein the base station antenna comprises a radome located at the second side of the reflection plate, and the bevel gear pair unit and the at least one rack-and-pinion unit are placed in the second space between the radome and the reflection plate; and wherein the height of the second space is 20-40 mm.

* * * * *